US012041519B2

(12) United States Patent
Fiorese et al.

(10) Patent No.: US 12,041,519 B2
(45) Date of Patent: Jul. 16, 2024

(54) METHOD AND SYSTEM FOR SESSION AUTHORIZATION BY AN ONLINE CHARGING SYSTEM IN A WIRELESS NETWORK UTILIZING A SERVICE CAPABILITY EXPOSURE FUNCTION

(71) Applicants: Telefonaktiebolaget LM Ericsson (publ), Stockholm (SE); Virgilio Fiorese, McKinney, TX (US)

(72) Inventors: Virgilio Fiorese, McKinney, TX (US); Nipun Sharma, New Delhi (IN); Venkata Sameer Kumar Kodukula, Noida (IN); Rohit Shukla, Noida (IN); Tushar Sabharwal, Delhi (IN); Saulo Almeida Montenegro De Sa, New Brunswick, NJ (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 289 days.

(21) Appl. No.: 17/293,380

(22) PCT Filed: Nov. 20, 2018

(86) PCT No.: PCT/US2018/062137
§ 371 (c)(1),
(2) Date: May 12, 2021

(87) PCT Pub. No.: WO2020/106285
PCT Pub. Date: May 28, 2020

(65) Prior Publication Data
US 2022/0014882 A1 Jan. 13, 2022

(51) Int. Cl.
H04M 15/00 (2024.01)
H04W 4/24 (2018.01)
H04W 28/16 (2009.01)

(52) U.S. Cl.
CPC ............. *H04W 4/24* (2013.01); *H04M 15/64* (2013.01); *H04M 15/8228* (2013.01); *H04M 15/88* (2013.01); *H04W 28/16* (2013.01)

(58) Field of Classification Search
CPC ............. H04M 15/64; H04M 15/8228; H04M 15/854; H04M 15/785; H04L 67/141;
(Continued)

(56) References Cited

U.S. PATENT DOCUMENTS 6,892,063 B2 * 5/2005 Savolainen ........... H04M 15/58
455/406
9,544,751 B2 * 1/2017 McNamee ........ H04M 15/8044
(Continued)

FOREIGN PATENT DOCUMENTS

CN 101350770 A 1/2009

OTHER PUBLICATIONS

3GPP, "3rd Generation Partnership Project; Technical Specification Group Services and System Aspects; Telecommunication management; Charging management; Charging architecture and principles (Release 15)", TS 32.240, V15.1.0, Mar. 2018, 58 pages.
(Continued)

*Primary Examiner* — Pakee Fang
(74) *Attorney, Agent, or Firm* — Weisberg I.P. Law, P.A.

(57) ABSTRACT

Methods and systems for an online charging system to grant resources to a session with a terminal device when the session includes a large file or the session has a long duration. Embodiments the invention include methods performed by an electronic device for online charging in a wireless network. In one embodiment, the electronic device receives a request message for resources to set up a session with a terminal device, where the request message is sent from a core network interface to an online charging function (OCF), and where the request message indicates that the
(Continued)

session includes a large file or that the session has a long duration. The electronic device determines that the terminal device has enough credit for the session based on the request message and grants the resources for the session with the terminal device based on the determination.

18 Claims, 12 Drawing Sheets

(58) Field of Classification Search
CPC ............. H04L 12/1435; H04L 12/1439; H04L 12/1467; H04L 67/12; G06F 9/45558; G06F 2009/45595
See application file for complete search history.

(56) References Cited

U.S. PATENT DOCUMENTS

| | | | |
|---|---|---|---|
| 9,900,444 B1* | 2/2018 | Seetharaman | H04M 15/8044 |
| 2009/0088188 A1* | 4/2009 | Wormald | H04L 67/04 |
| | | | 455/466 |
| 2015/0156334 A1 | 6/2015 | Chai | |
| 2015/0229779 A1 | 8/2015 | Hellgren et al. | |
| 2015/0271344 A1* | 9/2015 | Bertze | H04W 4/24 |
| | | | 455/408 |
| 2016/0373591 A1* | 12/2016 | Sharma | H04M 15/8077 |
| 2017/0273079 A1* | 9/2017 | Park | H04L 27/2646 |

OTHER PUBLICATIONS

3GPP, "3rd Generation Partnership Project; Technical Specification Group Services and System Aspects; Telecommunication management; Charging management; Charging architecture and principles (Release 15)", TS 32.240, V15.3.0, Sep. 2018, 60 pages.

Calhoun et al., "Diameter Base Protocol", Network Working Group, Request for Comments: 3588, Sep. 2003, 147 pages.

Hakala et al., "Diameter Credit-Control Application", Network Working Group, Request for Comments: 4006, Aug. 2005, 114 pages.

* cited by examiner

METHOD AND SYSTEM FOR SESSION AUTHORIZATION BY AN ONLINE CHARGING SYSTEM IN A WIRELESS NETWORK UTILIZING A SERVICE CAPABILITY EXPOSURE FUNCTION

CROSS-REFERENCE TO RELATED APPLICATIONS

This application is a National stage of International Application No. PCT/US2018/062137, filed Nov. 20, 2018, which is hereby incorporated by reference.

TECHNICAL FIELD

Embodiments of the present disclosure relate to the field of wireless communications, and more specifically, relate to methods and systems to authorize a session at an online charging system in a wireless network.

BACKGROUND ART

A wireless network includes a charging functionality and management system to manage billing of a user in the wireless network. The billing may be performed at various charging domains such as on the bearer (e.g., the evolved packet core, EPC) level, subsystem (e.g., Internet multimedia subsystem, IMS) level, and/or service (e.g., multimedia messaging service, MMS) level. The wireless network provides functions that implement offline and/or online charging mechanisms and performs real-time monitoring of resource usage at the various charging domains to detect the relevant chargeable events.

In offline charging, the resource usage is reported from the network to a charging domain after the resource usage has occurred. The user is then charged for the resources used. The offline charging does not require real-time authorization for using the resources.

On the other hand, in online charging, a user obtains an authorization for the resource usage from an online charging system prior to the occurrence of the actual resource usage. The charging information for the resource usage is then collected concurrently with the consumption of the resources. Upon the authorized resources being exhausted, the user needs to renew its authorization to continue its resource usage. In the present system, the amount of resources reserved for an authorization is more or less fixed, often depending upon pre-defined logic.

SUMMARY

Embodiments of the invention offer efficient ways for an online charging system to grant resources to a session with a terminal device when the session includes a large file or the session has a long duration. Embodiments of the invention include methods performed by an electronic device for online charging in a wireless network. In one embodiment, the electronic device receives a request message for resources to set up a session with a terminal device, where the request message is sent from a core network interface to an online charging function (OCF), and where the request message indicates that the session includes a large file or that the session has a long duration. The electronic device determines that the terminal device has enough credit for the session based on the request message and grants the resources for the session with the terminal device based on the determination.

Embodiments of the invention include electronic devices to perform online charging in a wireless network. In one embodiment, the electronic device comprises a processor and computer-readable storage medium that provides instructions that, when executed by the processor, cause the electronic device to perform the operations of receiving a request message for resources to set up a session with a terminal device, where the request message is sent from a core network interface to an online charging function (OCF), and where the request message indicates that the session includes a large file or that the session has a long duration. The operations further include determining that the terminal device has enough credit for the session based on the request message and granting the resources for the session with the terminal device based on the determination.

Embodiments of the invention include computer-readable storage media that provide instructions (e.g., computer program) that, when executed by a processor of an electronic device, cause the electronic device to perform operations comprising one or more methods of the embodiments of the invention.

Through using the indication in the request message for resources to set up a session with a terminal device, an online charging system may grant the proper resources for the session that has a large amount of information or a long duration, thus a session may not require multiple messages to renew the authorization for the session. The reduced number of messages to and within the online charging system, as well as that of the messages between network entities outside of the online charging system, allows the online charging to be performed more efficiently.

BRIEF DESCRIPTION OF THE DRAWINGS

The invention may best be understood by referring to the following description and accompanying drawings that illustrate embodiments of the invention.

DETAILED DESCRIPTION

Figure 1:
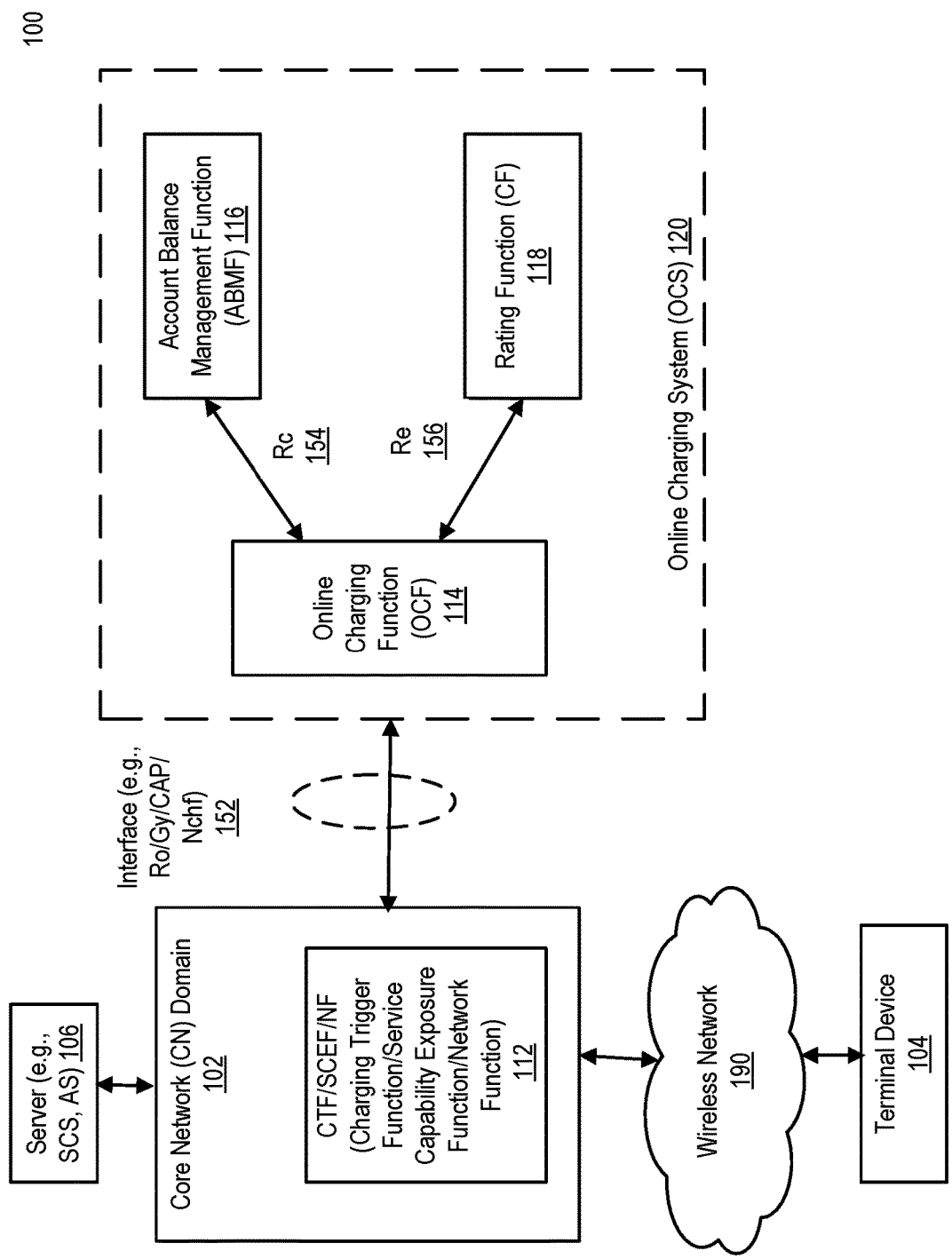
FIG. 1 shows a charging system architecture of a wireless network per one embodiment.

The following description describes methods, apparatus, and computer programs to authorize a session at an online charging system in a wireless network. In the following description, numerous specific details such as logic implementations, opcodes, means to specify operands, resource partitioning/sharing/duplication implementations, types and interrelationships of system components, and logic partitioning/integration choices are set forth to provide a more thorough understanding of the present invention. One skilled in the art will appreciate, however, that the invention may be practiced without such specific details. In other instances, control structures, gate level circuits and full software instruction sequences have not been shown in detail in order not to obscure the invention. Those of ordinary skill in the art, with the included descriptions, will be able to implement proper functionality without undue experimentation.

Bracketed text and blocks with dashed borders (such as large dashes, small dashes, dot-dash, and dots) may be used to illustrate optional operations that add additional features to the embodiments of the invention. Such notation, however, should not be taken to mean that these are the only options or optional operations, and/or that blocks with solid borders are not optional in some embodiments of the invention.

Terms

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as a computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, or a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radio frequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless communication network (or "wireless network," and the two terms are used interchangeably) is a network of electronic devices communicating using radio waves (electromagnetic waves within the frequencies 30 KHz-300 GHz). The wireless communications may follow wireless communication standards, such as new radio (NR), LTE-Advanced (LTE-A), LTE, wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the invention, the invention may apply to other wireless communication networks, including LTE operating in unlicensed spectrums, Multefire system, IEEE 802.11 systems. While 4G and/or 5G based systems and their components are used as examples in this disclosure, embodiments of the invention apply to other wireless communication networks as well.

A network device (ND) (also referred to as a network node or node, and these terms are used interchangeably in this disclosure) is an electronic device in a wireless communication network via which a terminal device accesses the network and receives services therefrom. One type of network devices may refer to a base station (BS) or an access point (AP), for example, a node B (NodeB or NB), an evolved NodeB (eNodeB or eNB), a next generation node B (gNB), a remote radio unit (RRU), a radio header (RH), a remote radio head (RRH), a relay, and a low power node such as a femtocell and a picocell.

A terminal device may access a wireless communication network and receive services from the wireless communication network through a network device. A terminal device may also be referred to as a wireless device (WD), and the two terms are used interchangeably in this disclosure. A terminal device may be a user equipment (UE), which may be a subscriber station (SS), a portable subscriber Station, a mobile station (MS), an access terminal (AT), or other end user devices. An end user device (also referred to as end device, and the two terms are used interchangeably) may be one of a mobile phone, a cellular phone, a smart phone, a tablet, a wearable device, a personal digital assistant (PDA), a portable computer, an image capture terminal device (e.g., a digital camera), a gaming terminal device, a music storage and playback appliance, a smart appliance, a vehicle-mounted wireless terminal device, a smart speaker, and an Internet of Things (IoT) device. Terminal devices may be coupled (e.g., through customer premise equipment coupled to an access network (wired or wirelessly)) to edge NDs, which are coupled (e.g., through one or more core NDs) to other edge NDs, which are coupled to electronic devices acting as servers.

Charging System Architecture and Charging Request with Large File Indication

FIG. 1 shows a charging system architecture of a wireless network per one embodiment. The charging system architecture 100 includes a core network (CN) domain 102 that interacts with an online charging system (OCS) 120. The CN domain 102 provides interconnection of various pieces of the wireless network and a path for the exchange of information between different subnetworks such as various local area networks (LANs). It provides a service control platform that allows creation of new multimedia and multisession applications utilizing wireless and wireline transport capabilities. The CN domain 102 interacts with modules inside and outside of the wireless network to provide functionalities and services to users (or subscribers, and the terms of "user" and "subscriber" are used interchangeably in this disclosure) of the wireless network, and the CN domain 102 may be implemented in one or more network devices. The CN domain 102 includes an IP multimedia subsystem (IMS) defined by the $3^{rd}$ Generation Partnership Project (3GPP) in one embodiment.

The CN domain 102 is coupled to an OCS 120. The OCS 120 oversees charging/billing of the wireless network in all charging domains, including bearer, subsystem, and service. It may be implemented in an electronic device. While the OCS 120 is shown as a separate entity outside of the CN domain 102 in the figure, the OCS 120 is within the CN domain 102 in some embodiments.

The OCS 120 includes an online charging function (OCF) 114, an account balance management function (ABMF) 116, and a rating function (RF) 118. The OCF 114 interacts with other functions in the wireless network and performs online charging. The OCF 114 may charge in an event-based manner or in a session-based manner, depending on the service uses. The OCF 114 may include a session-based charging function (SBCF), which is responsible for online charging of network and/or user sessions (e.g. voice calls), IP CAN (connectivity access network) bearers, IP CAN sessions, or IP multimedia subsystem (IMS) sessions. The SBCF may perform the session-based charging continuously during the session. The OCF 114 may also include an event-based charging function (EBCF) (also referred to as content charging), where the charging is performed once upon the event's happening. The EBCF may perform the charging in conjunction with any service capability server (SCS), application server (AS), or service network element, including a session initiation protocol (SIP) application server.

The OCF 114 is connected with an account balance management function (ABMF) 116 and a rating function (RF) 118 (e.g., by using Diameter-based Rc and Re reference points 154 and 156, respectively). The ABMF 116 and RF 118 store information that is used in online charging and that is at the OCS 120. The ABMF 116 contains information about a user's credit as well as counters associated with the user. A counter is an aggregation of units of service usage (or monetary units), which may be in relation to the user contractual terms with his service provider (e.g., a number of minutes for voice calls that are free of charge per month). As a service is being used, the value of counters associated with the service is updated accordingly. By using counters, it is possible to establish a user specific loyalty program such as service price discounts or bonus programs. The ABMF 116 may additionally be connected with a recharging server, used to buy more credits if available credits are (nearly) depleted. The credits for a user/session are measured in units of service usage (e.g., the number of bytes), duration (e.g., the number of seconds), or monetary units (e.g., the dollar amount the user/session is qualified for) in some embodiments.

The RF 118 contains prices of all available services. It may provide the OCF 114 with either information about a price of a certain service unit considering the charging model used, or information about price of a given service session, considering the price of the service unit, charging model used, and the number of service units consumed. Additionally, the RF 118 maintains the user context information, which is defined as a list of currently active services per user in this architecture. By using the context information, the RF 118 may perform a correlation process, i.e., a process in which service prices applied to the user may be modified depending on other active services in progress.

Various interfaces (also referred to as reference points) at reference 152 interconnect the CN domain 102 and the OCS 120 as defined in standards, including a CAP interface, a Ro interface, a Gy interface, and a Nchf interface.

The CAP interface is short for a customized application for mobile network enhanced logic (CAMEL) application part (CAP) interface, which interfaces a mobile service switching center (MSC) and/or serving general packet radio service (GPRS) support node (SGSN) with the OCS 120. The CAP interface is based on the signaling system No. 7 (SS7) based application protocol and is typically used for voice charging.

The Ro interface is an online charging interface toward other network elements (e.g., for IMS functions). The Gy interface may be one of an interface between a policy and charging enforcement function (PCEF) and the OCS 120 ("Gy") or an interface between a traffic detection function (TDF) and the OCS 120 ("Gyn"). The Gy interface may be used for online flow-based bearer charging. The Nchf interface is a service-based interface exhibited by the OCF 114. The Nchf interface is applicable to the charging of a network function (NF). The Ro interface, Gy interface, and Nchf interface are used for data charging including packet network charging.

In the CN domain 102, various functions at references 112 interact with the OCF 114 through the various interfaces 152. For example, a charging trigger function (CTF) may generate charging events based on the observation of network resource usage. In the network element and service element that provides charging information, the CTF may function as the focal point for collecting the information pertaining to chargeable events within the network element, assembling this information into matching charging events, and sending these charging events towards the OCS 120.

A service capability exposure function (SCEF) provides a means to securely expose the services and capabilities provided by the wireless network. The SCEF may monitor and provide notifications of desired events to a service capability server (SCS) or an application server (AS) regarding a terminal device. For example, the SCEF may support non-IP data delivery (NIDD) by a narrow band Internet of Thing (NB-IoT) device to the SCS/AS. A network function (NF) may be implemented either as a network element on a dedicated hardware, as a software instance running on a dedicated hardware, or as a virtualized function instantiated on an appropriate platform (referred to as virtualized network function (VNF) through network function virtualization (NFV)), e.g., a cloud infrastructure. Note that the NF may include the SCEF in one embodiment, and the SCEF may include the modules/functionality of the CTF when it interacts with the OCF 114 in one embodiment. Thus, the NF may be a superset of the SCEF, which in turn may be the superset of the CTF.

For a session-based charging, the initial charging event (a session start) may start from a terminal device 104, which is coupled to the CN domain 102 through a wireless network 190. It may also be from a server 106 such as a service capability server (SCS) or an application server (AS) that requires a session with the terminal device 104. The session start requests from either the terminal device 104 or server 106 are routed to the CN domain 102, where the requests get responses from the OCS 120 through the functions 112 and interface 152.

Figure 2:
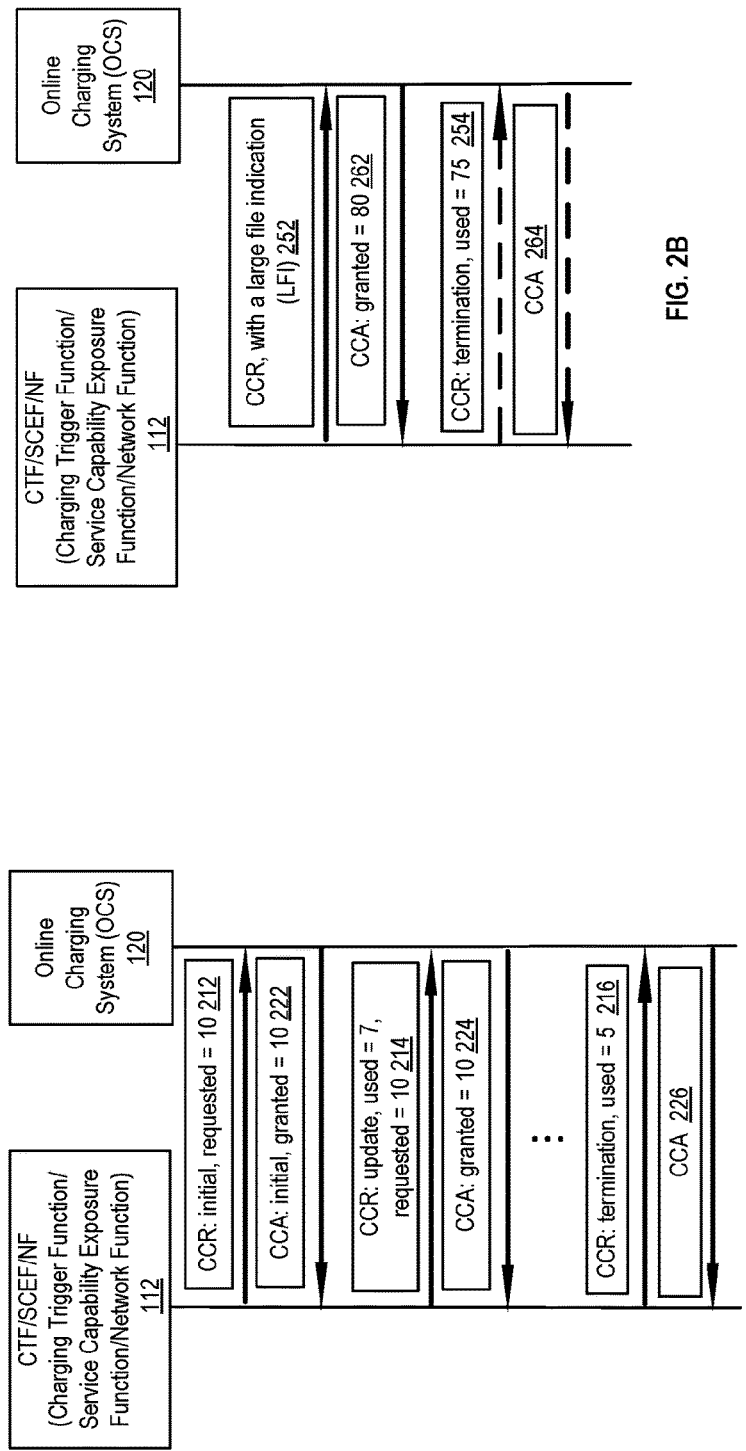
FIG. 2A shows an operation flow of a session without embodiments of the invention.
FIG. 2B shows an operation flow of a session with a large file indication included in a request message to an online charging system per one embodiment of the invention.
FIG. 2C shows an exemplary session information sequence to be included in a request message to an online charging system per one embodiment of the invention.

FIG. 2A shows an operation flow of a session without embodiments of the invention. At reference 212, an initial credit control request (CCR) is sent with the indication of a request for resources corresponding to ten credits. The ten credits may be the bytes to be transmitted to/from a terminal device, and they may be a duration of the session (e.g., in seconds). When a terminal device is an IoT device such as an NB-IoT device, it has a significantly limited power and bandwidth, thus transmission in one or few dozens of bytes are not uncommon. The OCS 120 grants the resources for the ten credits (e.g., through interaction of OCF 114 with ABMF 116 and RF 118) and acknowledges the request at reference 222 using a credit control answer (CCA), indicating the grant for the session.

The session continues, and at reference 214, another CCR is sent to the OCS 120, indicating resources corresponding to seven credits are used in the session, and resources corresponding to ten more credits are requested again. At reference 224, the OCS 120 grants the resources for the ten credits. The process may reiterate a few times, until the CCR is sent to the OCS 120 at reference 216, which indicates that resources for five credits are used, and the session can be terminated. The OCS 120 acknowledges the termination with a CCA at reference 226.

During this session, the OCS 120 receives multiple CCRs, which causes it to allocate resources repeatedly for the session. The OCS 120 has no information concerning the overall evaluation of the session (e.g., the complete duration or data volume of the session). The session-based charging involves reservation of units from the user's account (session-based charging with unit reservation (SCUR)): the OCS 120 reserves credit from the user's account and returns the corresponding quota (e.g. units specifying the number of minutes or bytes allowed) to a network element. The network element, in turn, uses the provided quota to supervise the actual network resource consumption. In the case that another chargeable event occurs for the session, the network element issues an "interim" charging event (e.g., the update CCR at reference 214) in order to also authorize this new chargeable event. When the quota is used up, the network element either issues another interim charging event, requesting further units to be allotted, or terminates the session if previously instructed to do so by the OCS 120. Once the session is terminated in the network element, the consumed units are reported back to the OCS 120 with a "final" charging event.

In this session, the start of the user session is authorized by OCS 120 after successfully performing credit control on the subscriber account. The amount of the credit reserved is more or less statically defined in OCS 120. This means that the amount reserved for a start/interim message for a CCR is statically defined and might not provide the optimized credit reservation depending on network information such as the user's history, kind of service requested, and site-specific characteristic. Yet such network information is available and defined in standards, and they can be utilized for session authorization in an online charging system.

For example, for an NB-IoT device, some maintenance sessions often include much larger files and/or longer session durations than a typical NB-IoT device session. These maintenance sessions include firmware/software upgrade sessions of the NB-IoT device, and log file retrieval sessions from the NB-IoT device. While a typical NB-IoT device session transmits one or few dozens of bytes, a maintenance session for a NB-IoT device may include a few hundred bytes.

When the session start request for the maintenance session includes a regular CCR such as the CCR 212, the session requires multiple update CCRs (interim charging events) such as the CCR 214 and corresponding CCAs to maintain the session. The signaling between the functions 112 and the OCS 120 can be wasteful and inefficient when the requesting party knows that the session includes a large file at the start of the maintenance session.

FIG. 2B shows an operation flow of a session with a large file indication included in a request message to an online charging system per one embodiment of the invention. At reference 252, the CCR is sent with a large file indication. The large file indication may indicate that the session contains a large file or that the session has a long duration, and the large/long is comparative to the typical file size and session duration for a given user (e.g., a terminal device such as an IoT device) and/or the kind of service requested. At reference 262, based on the large file indication, the OCS 120 allocates more resources corresponding to the large file indication. The OCS 120 then acknowledges the request at reference 262. While the OCS 120 grants resources for 10 credits per one CCR in FIG. 2A, the OCS 120 grants resources for 80 credits at reference 262. The functions 112 no longer need to request further credits through an update CCR, and the session may be completed without a further credit request. Upon the session being completed, the functions 112 may optionally notify the OCS 120 of the consumed credit at reference 254, which indicates that resources corresponding to 75 credits are consumed, and the OCS 120 acknowledges the session termination with a CCA at reference 264.

Through the OCS 120 granting resources for much more than the pre-defined credit units based on the large file indication, the signaling between the functions 112 and the OCS 120 can be reduced dramatically, thus the bandwidth/signaling resources may be saved for the online charging session.

In addition to the large file indication, a request message to an online charging system may use other information that are defined in standards such as the ones created by radio access network (RAN) working group 2 (WG2), commonly known as RAN2, for radio layer 2 and radio layer 3 radio resource (RR) specification in radio access network (RAN), and by RAN WG3, commonly known as RAN3, for Iub Iur and Iu specifications. The other information may include subscription-based information such as values for control plane parameters, terminal device battery parameters, and traffic profile parameters; and it may also include network vendor container information that is defined for individual networking product vendors. Some of the information may be included in a session information sequence within the request message to an online charging system as detailed below.

FIG. 2C shows an exemplary session information sequence to be included in a request message to an online charging system per one embodiment of the invention. The exemplary session information sequence 270 includes a number of parameters, and an embodiment of the invention may have a session information sequence with more or less parameters as shown.

The exemplary session information sequence 270 includes a large file indication parameter 272. In one embodiment, the large file indication may be a Boolean value, indicating whether the large file indication is set or not. In an alternative embodiment, the large file indication may be a value, which indicates an expected file size of the session and/or an expected session duration of the session. The value may be a rough expectation based on historical data of the user traffic or the type of the packets to be transmitted to or from a terminal device for a particular session. Similarly, the Boolean value may be set based on the historical data and the type of the packets too.

The session information sequence 270 also includes a traffic profile pattern parameter 274. The traffic profile pattern indicates that the requested session includes a traffic pattern selected from multiple choices such as a single uplink (SUL) packet only, single downlink (SDL) packet only, single uplink packet only followed by a single downlink packet (SULSDL), single uplink packet only followed by multiple downlink packets (SULMDL), and multiple uplink packets followed by a single downlink packet only (MULSDL).

The session information sequence 270 may additionally include a packet size parameter 276, the value of which indicates a size of the payload in the indicated traffic profile pattern. The session information sequence 270 may also include a stationary indication 278, indicating whether the terminal device involved in the session to be initiated is stationary or not. For example, a smart speaker may be stationary while a cellular phone is not. The session information sequence 270 may further include battery information 279, which indicates the battery status of the terminal device involved in the session to be initiated. The value of the battery information may indicate whether the battery is chargeable, a current battery level, and/or an expected duration that the battery may provide sufficient power to the terminal device.

The session information sequence 270 provides the current system status (e.g., current battery level) and session information (e.g., large file indication, traffic profile pattern, packet size). When the OCS 120 obtains the session information from a request message for a session, the OCS 120 may reserve proper credits from the user's account and return the corresponding quota so that the proper amount of resources is granted for the session. Such session information—based grant of resources may be more efficient than the pre-defined logic performed in prior approaches.

The session information sequence 270 may allow a network device to decide whether a data transfer from a terminal device (e.g., an NB-IoT device) should be sent over to a control plane (e.g. non-IP data delivery (NIDD)) or traditional user plane. For example, a large file indication within the session information sequence 270 may cause the data transfer to be transferred through the NIDD. Note that the NB-IoT device may comply with various Narrowband cellular standards such as LET Cat 0/1/M1/NB1 or EC-GSM-IoT, and they may take advantage of the information included in the session information sequence 270 to use NIDD.

Additionally, the session information sequence 270 may be used to pre-reserve an ultra-reliable long session that can take hours in connected mode and cannot be affected by long sessions fraud detection break points. For example, the large file indication causes the ultra-reliable long sessions to be set up in advance. Furthermore, pre-reservation of low latency communication sessions may not be able to wait for a centralized ABMF approval process; by recognizing the information in the session information sequence 270, the OCS 120 may pre-reserve the resources for the low latency communication sessions. Further, the session information sequence 270 may be used to optimize the Evolved Packet Core (EPC) part when it is forwarded to the RAN (e.g., from a terminal device or a server) and then to the EPC part.

Exemplary Operation Flows

Figure 3:
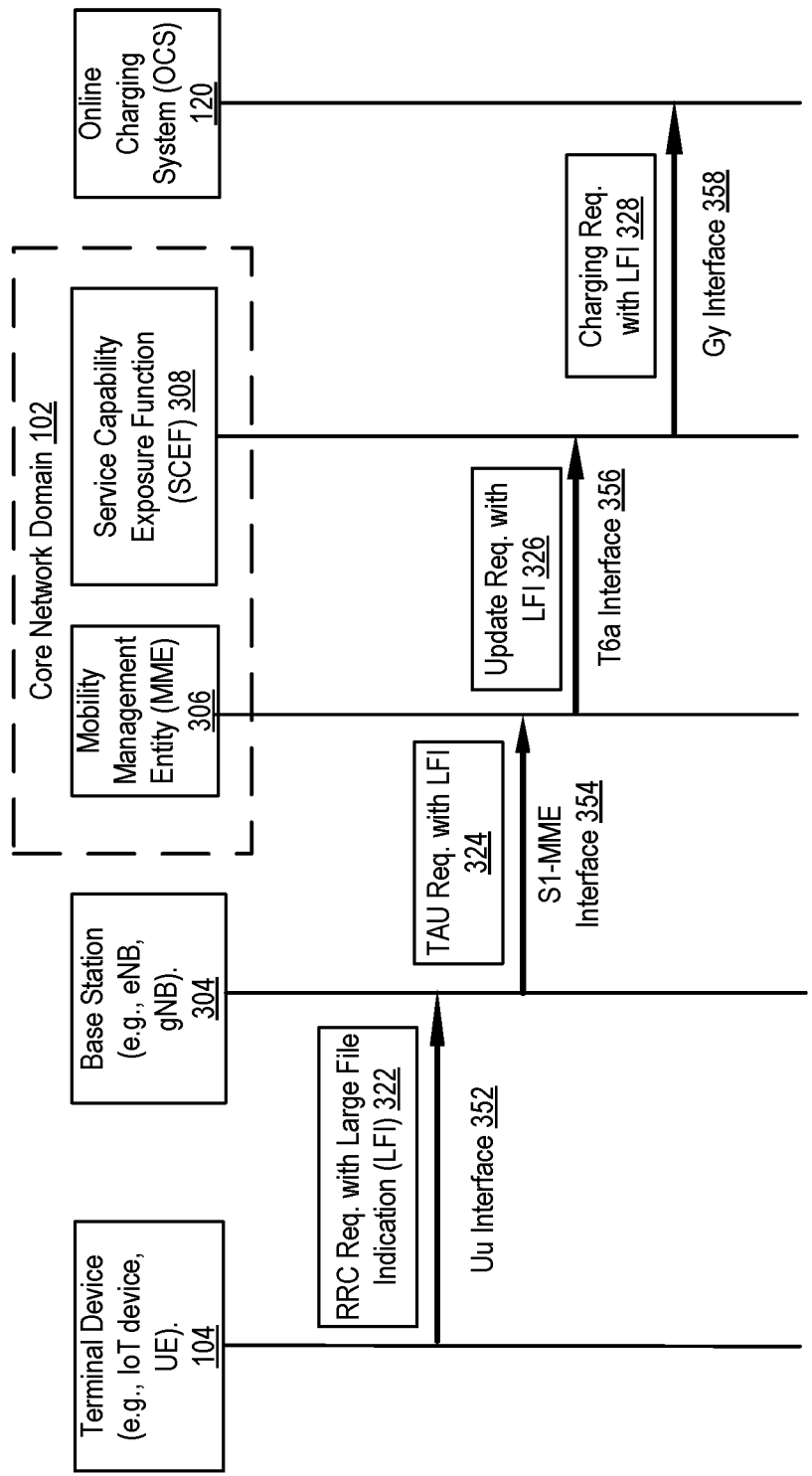
FIG. 3 shows an operation flow of a session initiated from a terminal device to an online charging system per one embodiment of the invention.

A number of exemplary embodiments are now illustrated to explain the implementation details in some embodiments. FIG. 3 shows an operation flow of a session initiated from a terminal device to an online charging system per one embodiment of the invention. At reference 322, the terminal device 104 sends a radio resource control (RRC) request with a large file indication to a base station 304. The request is sent through a Uu interface 352 in one embodiment.

The base station 304 is a network device discussed herein above. It, in turn, sends a track area update (TAU) request with a large file indication to a mobile management entity (MME) 306. The TAU request is sent through a S1-MME interface 354 in one embodiment. The MME 306 is a control-node for an access network (e.g., the LTE access-network). MME 306 is responsible for idle mode terminal device (e.g., a UE) paging and tagging procedure including retransmissions. It is involved in the bearer activation/deactivation process and is also responsible for authenticating a user (by interacting with a home subscriber server, HSS). The Non-Access Stratum (NAS) signaling (e.g., for an IoT device) terminates at the MME 306. MME 306 may also be responsible for the generation and allocation of temporary identities to the user. It checks the authorization of the user to camp on the service provider's Public Land Mobile Network (PLMN) and enforces terminal device roaming restrictions. The MME 306 is the termination point in the network for ciphering/integrity protection for NAS signaling and handles the security key management.

The MME 306 then sends an update request with a large file indication at reference 326 to a SCEF 308. The update request is sent through a T6a interface 356 in one embodiment. The SCEF 308 then sends a charging request (e.g., a CCR) with a large file indication at reference 328 to the OCS 120. The charging request with the large file indication is sent through a Gy interface 358 in one embodiment.

Note that each of the large file indications in FIG. 3 may be included in a session information sequence (e.g., the session information sequence 270) that includes other session information discussed herein above. Using the large file indication (optionally using the other information included in the session information sequence), the OCS 120 may perform appropriate credit reservation for a big payload from a terminal device in advance.

Figure 4:
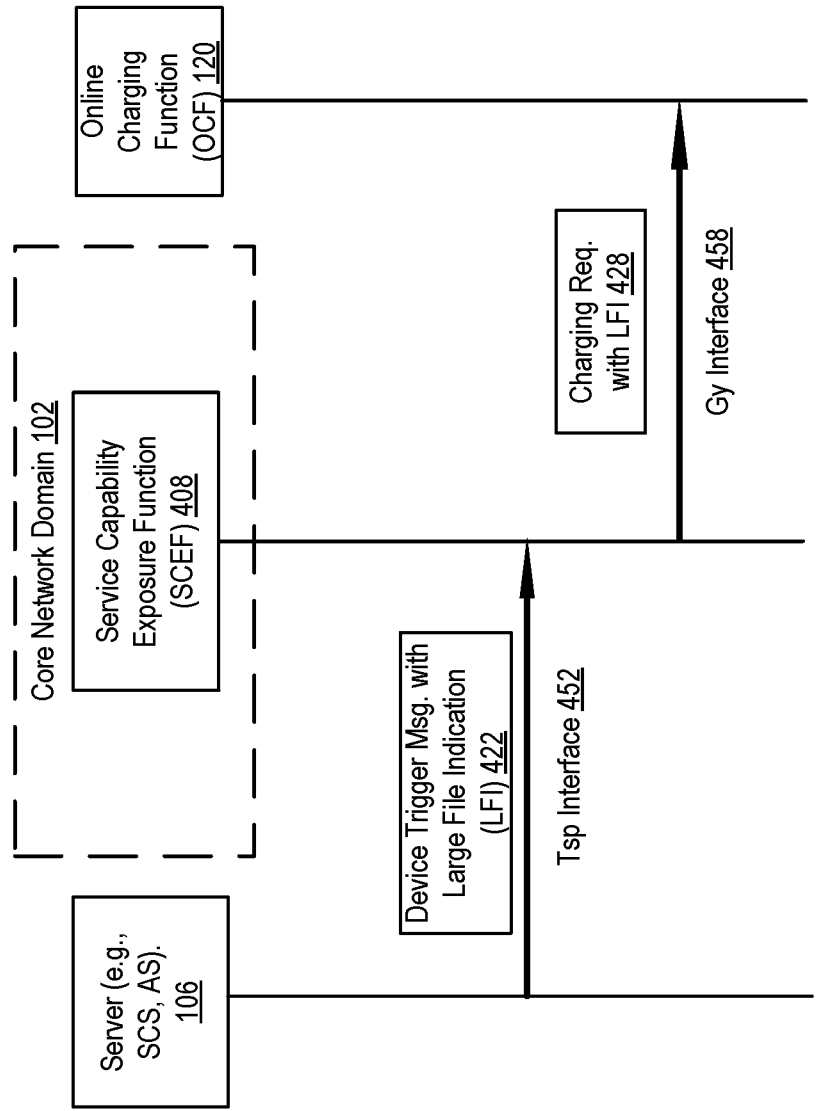
FIG. 4 shows an operation flow of a session initiated from a server to an online charging system per one embodiment of the invention.

FIG. 4 shows an operation flow of a session initiated from a server to an online charging system per one embodiment of the invention. At reference 422, the server 106 notifies a SCEF 408 in the CN domain 102 about the session using a device trigger message. The device trigger message includes a large file indication, and it is sent through a Tsp interface 452 in one embodiment. The Tsp interface is a Representational state transfer (REST) application programming interface (API) (also known as a RESTful API). The device trigger message 422 may be similar to the device trigger message defined between a machine type communication (MTC) interworking function (MTC-IWF) and a SCS/AS with the exception that the device trigger message 422 includes a large file indication (and optionally other session information such as the ones included in the session information sequence discussed herein above).

The SCEF 408 then sends a charging request with a large file indication at reference 428 (similar to the charging request 328). In one embodiment, the charging request 428 is sent through a Gy interface 458 (similar to the Gy interface 358). The operations at the SCEF 408 are similar to the ones at the SCEF 308 and are not repeated here.

Figure 5:
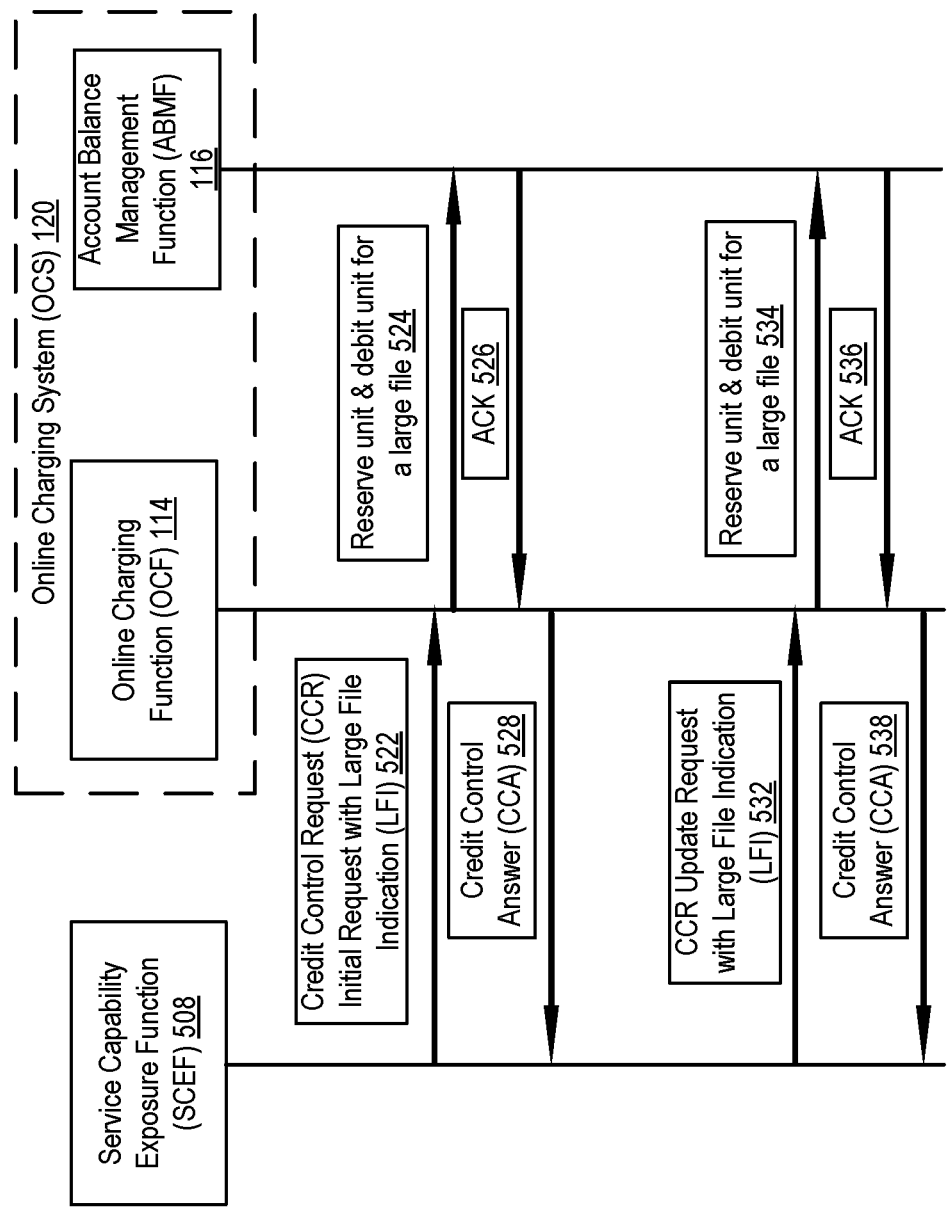
FIG. 5 shows an operation flow of a session reserving and debiting credit units per one embodiment of the invention.

FIG. 5 shows an operation flow of a session reserving and debiting credit units per one embodiment of the invention. At reference 522, a CCR initial request with a large file indication is sent from a SCEF 508 to the OCF 114. The CCR initial request may include other session information included in the session information sequence discussed herein above. Upon receiving the CCR initial request 522, the OCF 114 requests the ABMF 116 reserve credit units and debit balance at reference 524. Based on the large file indication (and optionally other session information such as the ones included in the session information sequence discussed herein above), the ABMF 116 may reserve proper (e.g., large) credit units for the session. Once the reservation and debiting are performed successfully, the ABMF 116 sends a passive acknowledgment at reference 526 to the OCF 114. The OCF 114 then sends a CCA message 528 to the SCEF 508, acknowledging the CCR 522. The session now has resources granted to start. If the ABMF 116 cannot successfully reserve and debit the credit units for the session, a negative acknowledgement is returned to the SCEF 508, and the session cannot be started.

Additionally, a session may start without requiring a large file, and it may reserve and debit credit units for a regular session. Yet during the session, a large file is required to be sent through the session. The SCEF 508 may send a CCR update request with a large file indication at reference 532. Upon receiving the CCR update request, the OCF 114 requests the ABMF 116 reserve credit units and debit balance at reference 534. Based on the large file indication in the CCR update request (and optionally other session information such as the ones included in the session information sequence discussed herein above), the ABMF 116 may reserve proper (e.g., large) credit units for the session as discussed herein above, and the corresponding acknowledgement 536 and CCA 538 are returned.

Operations to Authorize a Session with a Large File Per Some Embodiments

Figure 6:
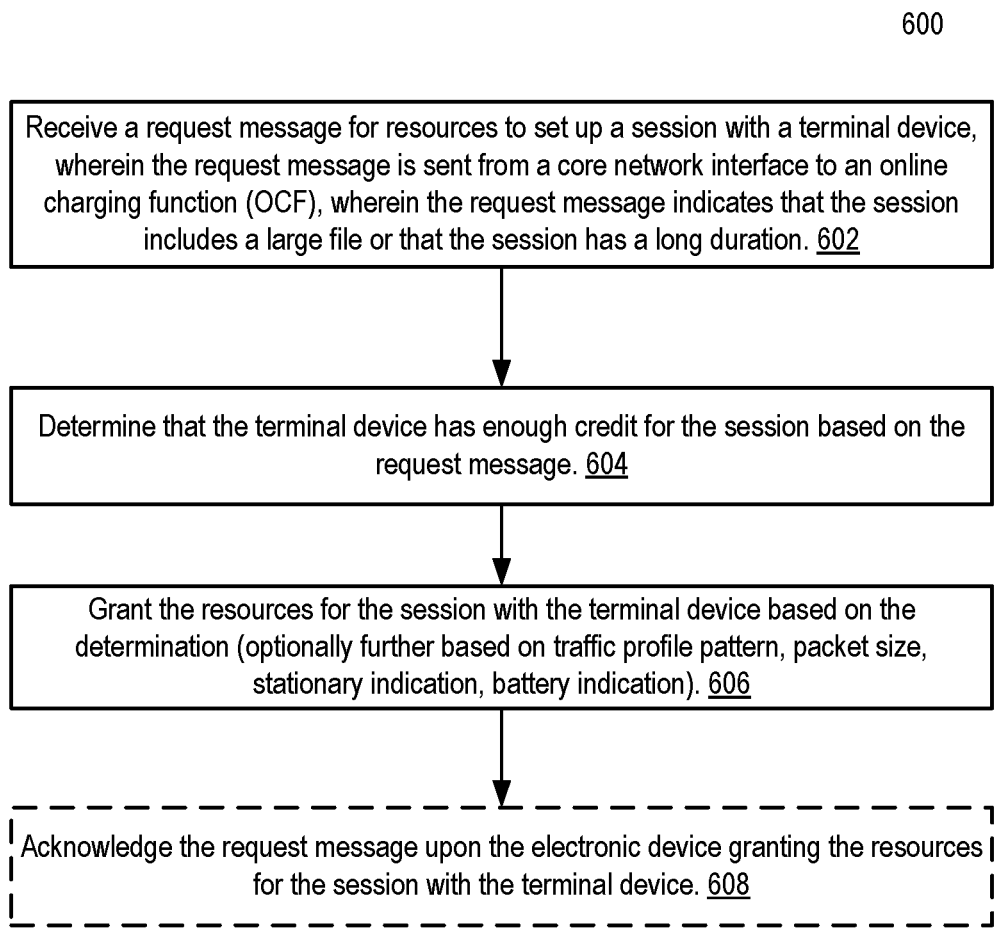
FIG. 6 is a flow diagram showing the operations to authorize a session with a large file per one embodiment of the invention.

FIG. 6 is a flow diagram showing the operations to authorize a session with a large file per some embodiments of the invention. Method 600 may be performed by an electronic device that implements an online charging system in a wireless network. The online charging system grants resources for a session with a terminal device. In one embodiment, the terminal device is a narrow band Internet of Thing (NB-IoT) device.

At reference 602, the electronic device receives a request message for resources to set up a session with a terminal device. The request message is sent from a core network interface to an online charging function (OCF), and the request message indicates that the session includes a large file or that the session has a long duration. The large file indication may indicate at least one of a large file to be transferred during the to-be-started session and a long duration of the session. The core network interface is coupled to a service capability exposure function (SCEF) that generates the request message. As discussed herein above, the request message may be generated based on a request sourced from the terminal device and arrives at the electronic device through a base station of the wireless network (see discussion relating to FIG. 3). Alternatively, the request message may be generated based on a request sourced from a network device providing a service to the terminal device (see discussion relating to FIG. 4).

In one embodiment, other than the large file indication, the request message further includes values for parameters indicating one or more of a traffic profile pattern, a packet size, a stationary indication of the terminal device, and a battery indication of the terminal device (see discussion relating to FIG. 2C).

In one embodiment, the core network interface is a Ro interface, a Gy interface, a customized application for mobile network enhanced logic (CAMEL) application part (CAP) interface, or an Nchf interface.

At reference 604, the electronic device determines that the terminal device has enough credit for the session based on the request message. The credit is one of a data volume and a session duration for the session in one embodiment. The electronic device determines the credit and reserve/debit credit for the session, e.g., through ABMF 116 discussed herein above.

At reference 606, the electronic device grants the resources for the session with the terminal device based on the determination. The resources include radio resources discussed in more details in FIGS. 9A-B. In one embodiment, granting the resources is performed only once for the session without multiple request messages for the session, thus the signaling messages to the online charging system are reduced.

Optionally at reference 608, the electronic device acknowledges the request message upon the electronic device granting the resources for the session with the terminal device.

An Electronic Device Implementing the Online Charging System

Figure 7:
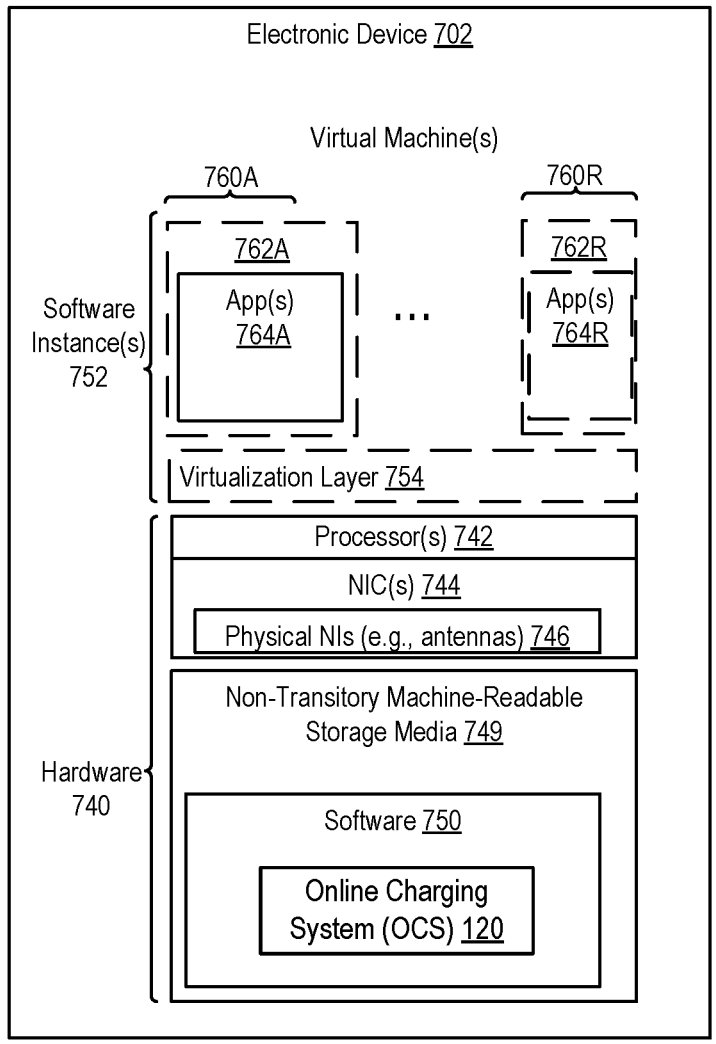
FIG. 7 shows an electronic device implementing the online charging system per one embodiment of the invention.

FIG. 7 shows an electronic device implementing the online charging system per one embodiment of the invention. The electronic device 702 may be implemented using custom application-specific integrated-circuits (ASICs) as processors and a special-purpose operating system (OS), or common off-the-shelf (COTS) processors and a standard OS.

The electronic device 702 includes hardware 740 comprising a set of one or more processors 742 (which are typically COTS processors or processor cores or ASICs) and physical NIs 746, as well as non-transitory machine-readable storage media 749 having stored therein software 750. During operation, the one or more processors 742 may execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R. The multiple software containers (also called virtualization engines, virtual private servers, or jails) are user spaces (typically a virtual memory space) that are separate from each other and separate from the kernel space in which the operating system is run. The set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R run on top of a guest operating system within an instance 762A-R called a virtual machine (which may in some cases be considered a tightly isolated form of software container) that run on top of the hypervisor—the guest operating system and application may not know that they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

The software 750 contains the online charging system (OCS) 120 that performs operations described with reference to FIGS. 1-6. The online charging system (OCS) 120 may be instantiated within the applications 764A-R. The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual electronic device 760A-R.

A network interface (NI) may be physical or virtual. In the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address).

A Wireless Network in Accordance with Some Embodiments

Figure 8:
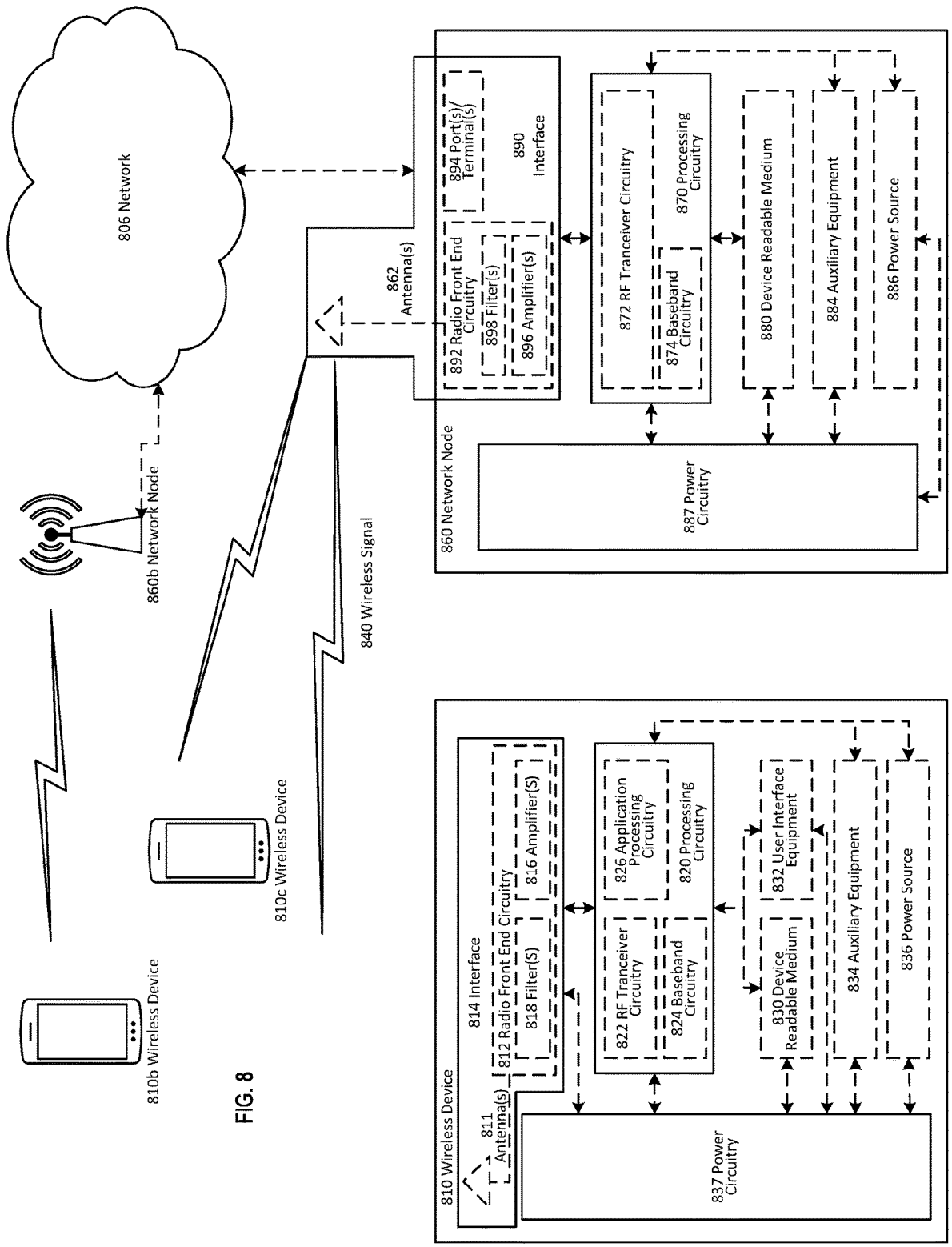
FIG. 8 shows a wireless network per one embodiment of the invention.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 861 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network 806 may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node, similar to network device discussed herein above, refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay.

A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SoC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 674 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 694, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 892 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 686. Power source 686 and/or power circuitry 887 may be configured to provide power to the various components of network node 860 in a form suitable for the respective components (e.g., at a voltage and current level needed for each respective component). Power source 686 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 686 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 620 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 812 is connected to antenna 811 and processing circuitry 820, and is configured to condition signals communicated between antenna 811 and processing circuitry 620. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SoC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Radio Resources Used in a Wireless Network

Figure 9A:
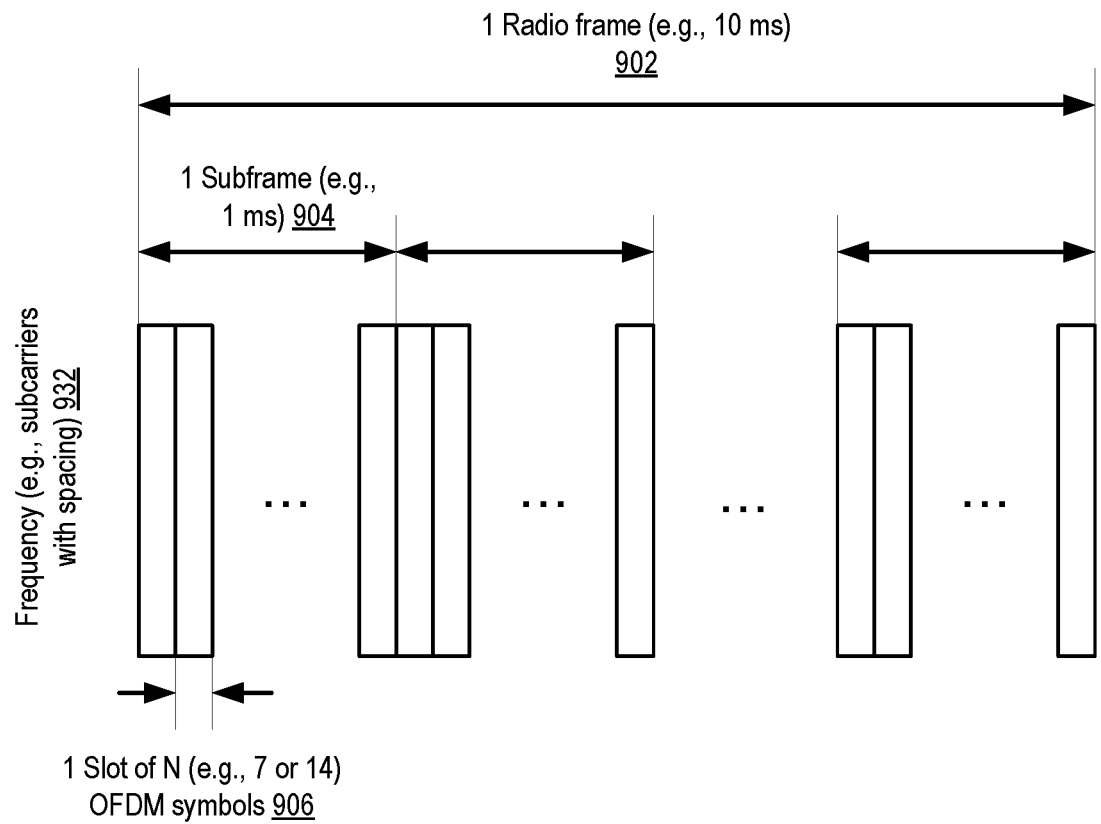
FIG. 9A shows an exemplary signal transmission hierarchy in a wireless network.

FIG. 9A shows an exemplary signal transmission hierarchy in a wireless network. The exemplary signal transmission hierarchy includes the transmission unit of frame such as radio frame 902. A radio frame 902 takes ten milliseconds to transmit in one embodiment. The frame may contain a number of subframes such as subframe 904. In this example, the radio frame 902 contains ten subframes, each takes one millisecond. Each subframe may contain a number of slots. For example, a subframe may contain two slots. Each slot such as the slot at reference 906 may contain a number of symbols. In one example, a slot contains either 7 or 14 symbols. The symbol is an orthogonal frequency-division multiplexing (OFDM) symbol in one embodiment.

The frame-subframe-slot-symbol hierarchy is an example of time domain hierarchy. In the frequency domain (as illustrated at reference 932), each symbol may be transmitted over a number of subcarriers. A symbol may be transmitted using a number of resource block (RB), each of which may contain 12 subcarriers in one embodiment. In one embodiment, each subcarrier includes a bandwidth (e.g., 7.5 kHz or 15 kHz) for transmission. One subcarrier×one symbol may be referred to as a resource element (RE), which is the smallest unit of resource to be allocated for signal transmission in one embodiment.

The illustrated frame structure offers an example for signal transmission. In this frame structure or other frame structures, data and signaling transmission is performed at a lowest level of time unit (symbol level in this case), which is included in a time unit (slot level in this example) a level over the lowest level of time unit in one embodiment. Data and signaling for one transmission from a source network device to a destination network device often use the same position within the signal transmission hierarchy, e.g., the same symbol position in consecutive slots (e.g., symbol #2 of each slot) or subframes, or in alternating slots (e.g., symbol #2 in every other slot) or subframes.

Figure 9B:
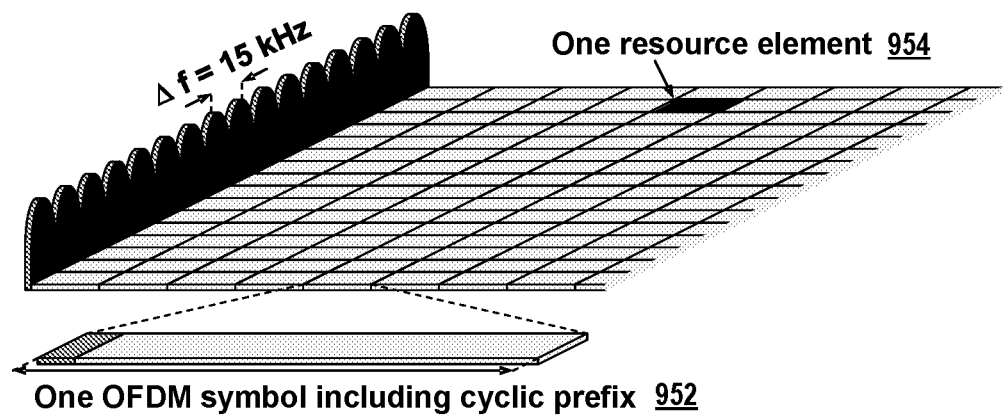
FIG. 9B shows resource elements used for data and signaling transmission.

FIG. 9B shows resource elements used for data and signaling transmission. The physical resources for transmission may be view as time and frequency grids as illustrated, where each resource element occupies a time period in the time domain and a frequency range in the frequency domain. Each OFDM symbol includes a cyclic prefix as illustrated at reference 952. Each OFDM symbol utilizes a number of resource elements. In this example, the subcarrier spacing is 15 k Hz, and the resource element (RE) 952 occupies an orthogonal frequency-division multiplexing (OFDM) sub-carriers within an OFDM symbol. A network device may allocate some resource elements for a particular type of signaling. Such allocation may be specified through identifying the time period in the time domain and the frequency range in the frequency domain in a signal transmission hierarchy; or it may be specified through identifying specific resource elements within the signal transmission hierarchy.

For downlink control, a wireless network may use PDCCHs (physical downlink control channels) to transmit downlink control information (DCI), which provides downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e. different code rate for a given payload size). A UE is configured (implicitly and/or explicitly) to blindly monitor (or search) for a number of PDCCH candidates of different aggregation levels and DCI payload sizes. Upon detecting a valid DCI message (i.e. the decoding of a candidate is successful, and the DCI contains a ID the UE is told to monitor) the UE follows the DCI (e.g. receives the corresponding downlink data or transmits in the uplink). The blind decoding process comes at a cost in complexity in the UE but is required to provide flexible scheduling and handling of different DCI payload sizes.

Terminal Device in Accordance with Some Embodiments

Figure 10:
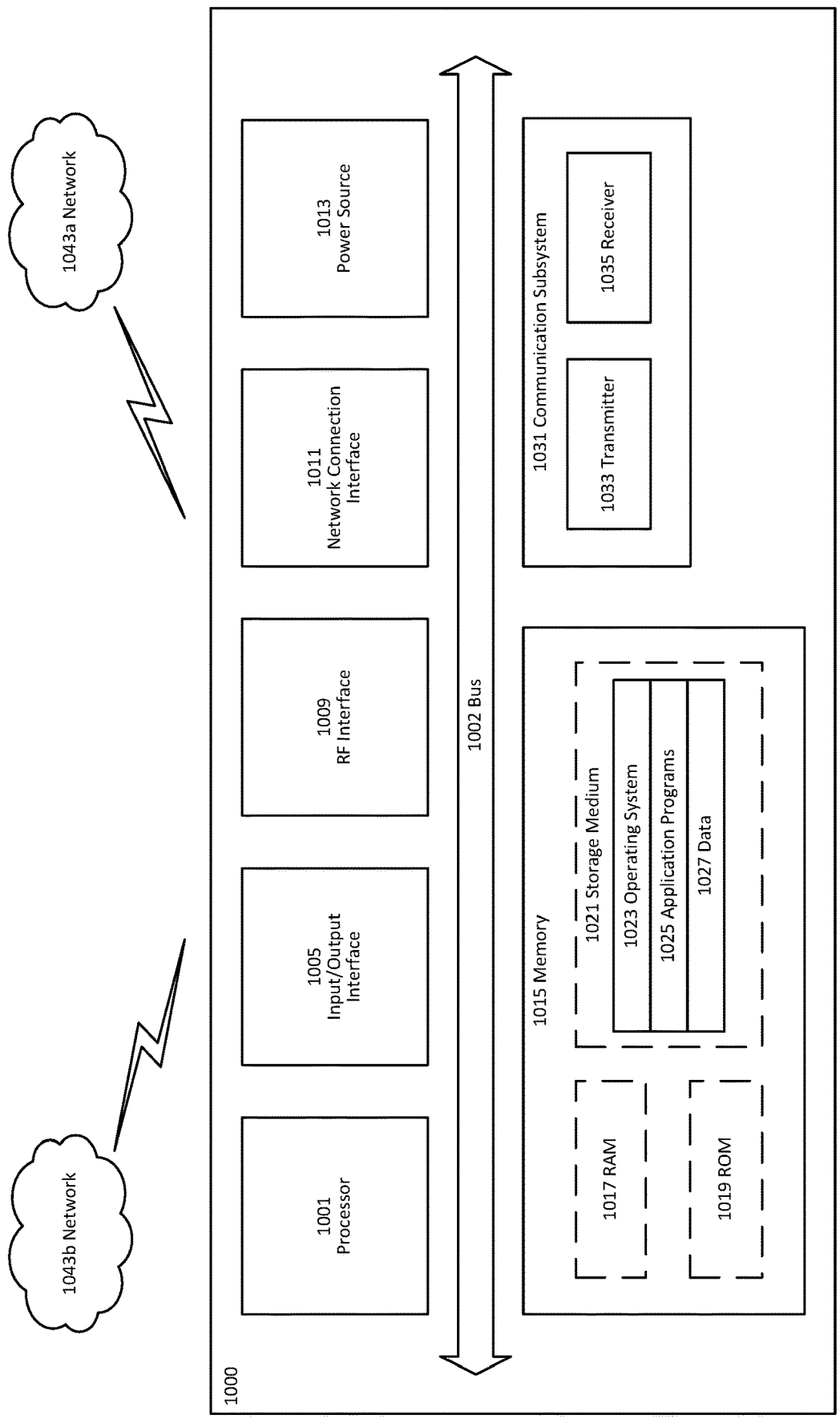
FIG. 10 shows one embodiment of a terminal device in accordance with various aspects described herein.

FIG. 10 shows one embodiment of a terminal device in accordance with various aspects described herein. As used herein, a terminal device may not necessarily have a user in the sense of a human user who owns and/or operates the relevant device. Instead, a terminal device may represent a device that is intended for sale to, or operation by, a human user but which may not, or which may not initially, be associated with a specific human user (e.g., a smart sprinkler controller). Alternatively, a terminal device may represent a device that is not intended for sale to, or operation by, an end user but which may be associated with or operated for the benefit of a user (e.g., a smart power meter). End user device 1000 may be any terminal device identified by the $3^{rd}$ Generation Partnership Project (3GPP), including a NB-IoT terminal device, a machine type communication (MTC) terminal device, and/or an enhanced MTC (eMTC) terminal device. Terminal device 1000, as illustrated in FIG. 10, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and terminal device may be used interchangeable. Accordingly, although FIG. 10 is a terminal device, the components discussed herein are equally applicable to a WD, and vice-versa.

In FIG. 10, terminal device 1000 includes processing circuitry 1001 that is operatively coupled to input/output interface 1005, radio frequency (RF) interface 1009, network connection interface 1011, memory 1015 including one or more of random access memory (RAM) 717, read-only memory (ROM) 1019, and storage medium 1021 or the like, communication subsystem 1031, power source 1013, and/or any other component, or any combination thereof. Storage medium 1021 includes one or more of operating system 1023, application program 1025, and data 1027. In other embodiments, storage medium 1021 may include other similar types of information. Certain terminal devices may utilize all of the components shown in FIG. 10, or only a subset of the components. The level of integration between the components may vary from one terminal device to another terminal device. Further, certain terminal devices may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. End user device 1000 may be configured to use an output device via input/output interface 1005. An output device may use the same type of interface port as an input device. For example, a USB port may be used to provide input to and output from terminal device 1000. The output device may be a speaker, a sound card, a video card, a display, a monitor, a printer, an actuator, an emitter, a smartcard, another output device, or any combination thereof. End user device 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by terminal device 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow terminal device 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043*b* using communication subsystem 1031. 'Network 743*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, terminal device, or base station of a radio access network (RAN) according to one or more communication protocols, such as IEEE 802.7, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of terminal device 1000.

The features, benefits and/or functions described herein may be implemented in one of the components of terminal device 1000 or partitioned across multiple components of terminal device 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Virtualization Environment in Accordance with Some Embodiments

Figure 11:
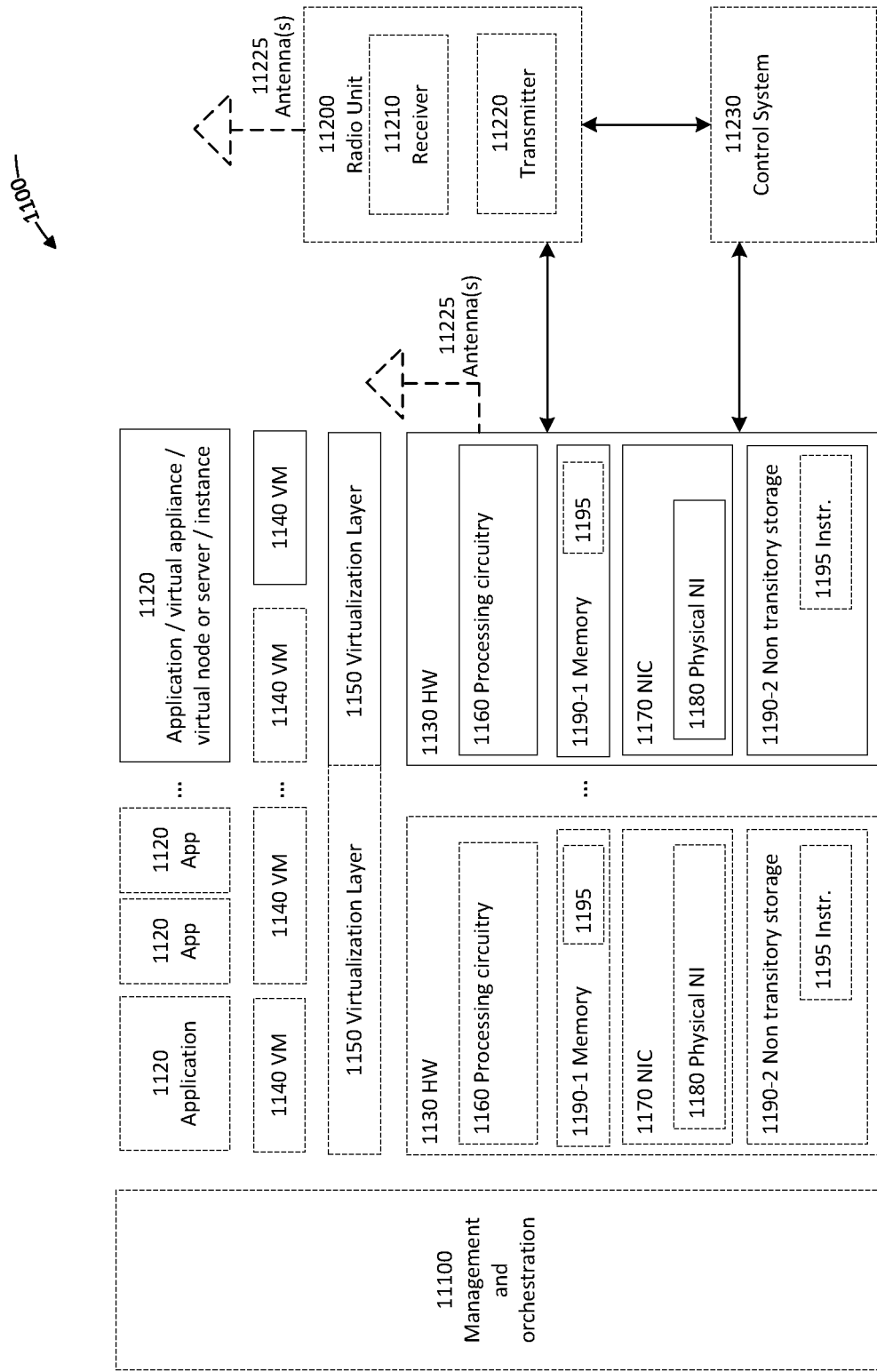
FIG. 11 shows a virtualization environment per one embodiment of the invention.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signaling can be effected with the use of control system 8230 which may alternatively be used for communication between the hardware nodes 1130 and radio units 11200.

Figure 12:
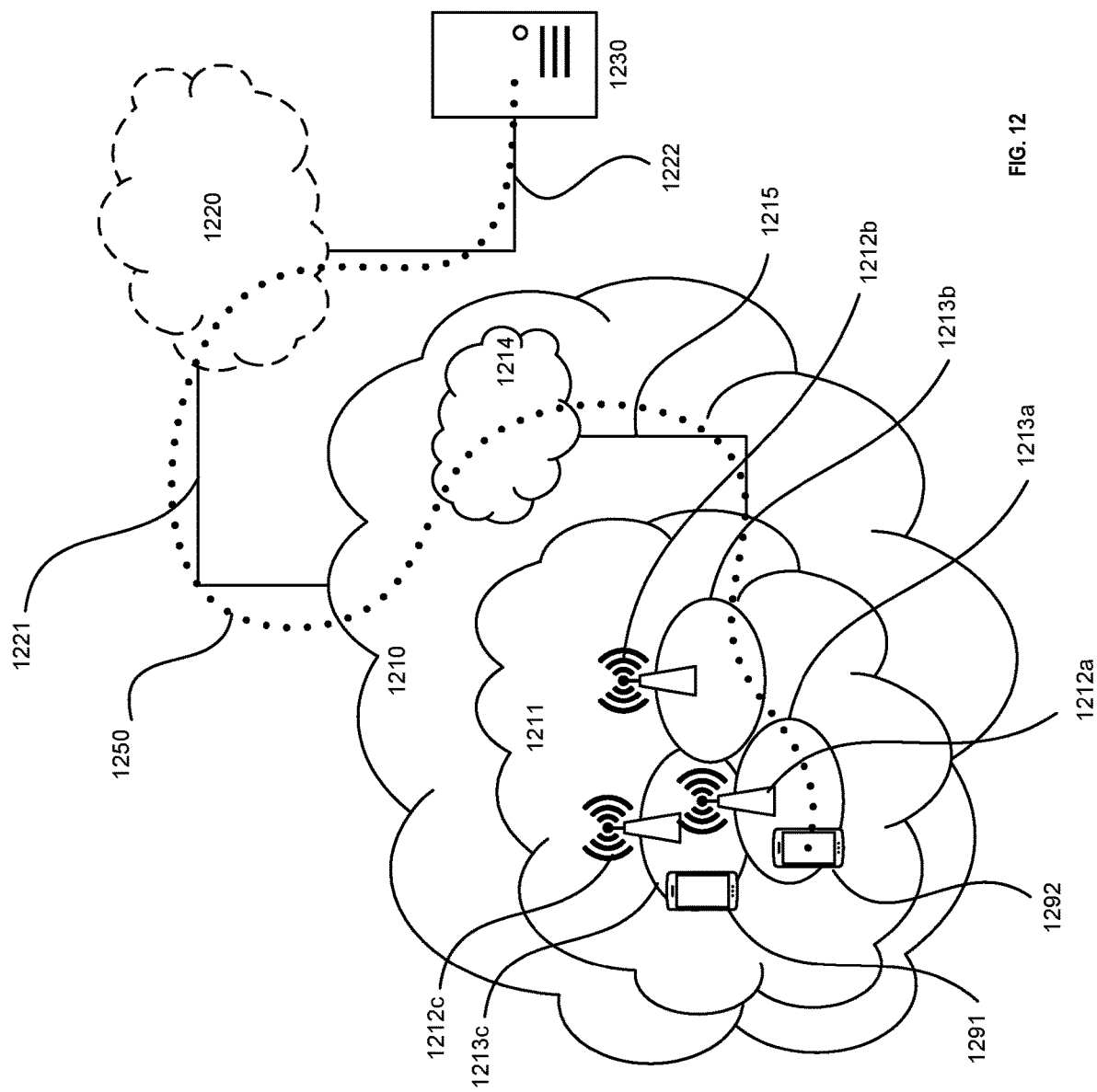
FIG. 12 shows a telecommunication network connected via an intermediate network to a host computer per one embodiment of the invention.

Telecommunication Network Connected Via an Intermediate Network to a Host Computer in Accordance with Some Embodiments With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or it may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Some of the embodiments contemplated herein above are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

What is claimed is:

1. A method performed by an electronic device for online charging in a wireless network, the method comprising:
receiving a request message for resources to set up a session with a terminal device, the request message being sent from a core network interface to an online charging function (OCF), and the request message including a large file indication indicating that the session includes at least one of a large file to be transferred during the session or a long session duration;

the core network interface being coupled to a service capability exposure function (SCEF), the SCEF being configured to generate the request message and to send the request message to the OCF;

determining that the terminal device had enough credit for the session based on the request message; and granting the resources for the session with the terminal device based on the determination.

2. The method of claim 1, wherein the request message further includes values for parameters indicating one or more of a traffic profile pattern, a packet size, a stationary indication of the terminal device, and a battery indication of the terminal device, and wherein granting the resources is further based on the values for the parameters.

3. The method of claim 1, further comprising:
acknowledging the request message upon the electronic device granting the resources for the session with the terminal device.

4. The method of claim 1, wherein the request message is generated based on a request sourced from the terminal device and arrives at the electronic device through a base station of the wireless network.

5. The method of claim 1, wherein the request message is generated based on a request sourced from a network device providing a service to the terminal device.

6. The method of claim 1, wherein the core network interface is a Ro interface, a Gy interface, a customized application for mobile network enhanced logic (CAMEL) application part (CAP) interface, or an Nchf interface.

7. The method of claim 1, wherein the credit is one of a data volume and a session duration.

8. The method of claim 1, wherein granting the resources is performed only once for the session without multiple request messages for the session.

9. The method of claim 1, wherein the terminal device is a narrow band Internet of Thing (NB-IoT) device.

10. An electronic device to be deployed in a wireless network, comprising:
a processor and computer-readable storage medium that provides instructions that, when executed by the processor, cause the electronic device to perform:
receiving a request message for resources to set up a session with a terminal device, the request message being sent from a core network interface to an online charging function (OCF), and the request message including a large file indication indicating that the session includes at least one of a large file to be transferred during the session or a long session duration;
the core network interface being coupled to a service capability exposure function (SCEF), the SCEF being configured to generate the request message and to send the request message to the OCF;
determining that the terminal device has enough credit for the session based on the request message; and
granting the resources for the session with the terminal device based on the determination.

11. The electronic device of claim 10, wherein the request message further includes values for parameters indicating one or more of a traffic profile pattern, a packet size, a stationary indication of the terminal device, and a battery indication of the terminal device, and wherein granting the resources is further based on the values for the parameters.

12. The electronic device of claim 10, wherein the electronic device is to further perform:
acknowledging the request message upon the electronic device granting the resources for the session with the terminal device.

13. The electronic device of claim 10, wherein the core network interface is a Ro interface, a Gy interface, a customized application for mobile network enhanced logic (CAMEL) application part (CAP) interface, or an Nchf interface.

14. A non-transitory computer-readable storage medium that provides instructions that, when executed by a processor of an electronic device, cause the processor to perform:
receiving a request message for resources to set up a session with a terminal device, the request message being sent from a core network interface to an online charging function (OCF), and the request message including a large file indication indicating that the session includes at least one of a large file to be transferred during the session or a long session duration;
the core network interface being coupled to a service capability exposure function (SCEF), the SCEF being configured to generate the request message and to send the request message to the OCF;
determining that the terminal device has enough credit for the session based on the request message; and
granting the resources for the session with the terminal device based on the determination.

15. The non-transitory computer-readable storage medium of claim 14, wherein the request message is generated based on a request sourced from the terminal device and arrives at the electronic device through a base station of a wireless network.

16. The non-transitory computer-readable storage medium of claim 14, wherein the request message is generated based on a request sourced from a network device providing a service to the terminal device.

17. The non-transitory computer-readable storage medium of claim 14, wherein the credit is one of a data volume and a session duration.

18. The non-transitory computer-readable storage medium of claim 14, wherein granting the resources is performed only once for the session without multiple request messages for the session.

* * * * *